United States Patent [19]

Morimoto

[11] Patent Number: 4,684,864
[45] Date of Patent: Aug. 4, 1987

[54] DRIVING CIRCUIT OF STEPPING MOTOR FOR FLOPPY DISK DRIVE

[75] Inventor: Atsutaka Morimoto, Kanagawa, Japan

[73] Assignee: Citizen Watch Co., Ltd., Tokyo, Japan

[21] Appl. No.: 841,548

[22] Filed: Mar. 20, 1986

[30] Foreign Application Priority Data

Mar. 25, 1985 [JP] Japan ................................ 60-060113

[51] Int. Cl.$^4$ .............................................. H02P 8/00
[52] U.S. Cl. .................................... 318/696; 318/685
[58] Field of Search ................................ 318/696, 685

[56] References Cited

U.S. PATENT DOCUMENTS 4,107,593 8/1978 Anderson ............................ 318/685

Primary Examiner—William M. Shoop, Jr.
Assistant Examiner—Saul M. Bergmann
Attorney, Agent, or Firm—Koda and Androlia

[57] ABSTRACT

A driving circuit of a stepping motor for a floppy disk drive which drives the stepping motor by feeding control signals supplied from a control circuit through drivers in order to feed a carriage, wherein the circuit includes an all zero power circuit which performs logical operation of the feeding control signals and the electricity saving signal therein and outputs all zero signals to the drivers at the electricity saving time in spite of the feeding control signals in supply so that the electric current is completely cut off to be stopped flowing to the drivers and the stepping motor and the power voltage loss can be firmly deleted. Accordingly, the device can be driven in low voltage and the total system can be designed in small sizes and in battery driving operation.

4 Claims, 3 Drawing Figures

DRIVING CIRCUIT OF STEPPING MOTOR FOR FLOPPY DISK DRIVE

BACKGROUND OF THE INVENTION

1. Field of The Invention

The present invention relates to a driving circuit of a stepping motor for a floppy disk drive, and more particularly to a driving circuit of a stepping motor which is capable of saving the consumption of electricity by cutoff of the driving electric current to the stepping motor and the driver at the standby for carriage feeding or after head seek.

2. Description of The Prior Art

The floppy disk drive has been widely used for external storage of the computer, and specifically in recent years practically used is the small sized device utilizing 3.5 inch or 3 inch micro floppy disk media, which is applied for the portable computers. In order to design such small sized or portable devices there is problem on the electric current consumption of the floppy disk drive itself. Specifically in the portable computer, decrease of the electric current consumption is strongly requested since the battery drive is required in the normal cases.

The electric current consumption of the floppy disk drive is occupied in its major part by the stepping motor which feeds or positions the carriage to a predetermined place and by the driver attached to the stepping motor, and the power saving of the electricity in these elements effects the total electric current consumption of the device.

In ordinary cases, it was generally thought that the hold current was necessary for the stepping motor at the standby or after the head seek as well as at the seek time so that the head can be positioned at the correct track. In recent years, however, the improvement of the stepping motor clarifies that the hold current is not always necessary at the standby and after the head seek, and it is offered that the electric current for the stepping motor be cut off at the standby and after the head seek by off-operation of the power saving switch.

In FIG. 3 shown therein is a power saving circuit in prior art. Feeding control signals are supplied from a driver 12 to a stepping motor 10, and action of the driver 12 is controlled by the feeding control signals supplied from a control circuit 14.

In the prior art device, it is composed as the electric current consumption in the stepping motor 10 and the driver 12 can be decreased by cutoff of the current flow from the power source (Vcc) to the driver 12 by a power saving switch 16 at the standby and after the head seek.

However, although the prior art device mentioned above takes preferable power saving action, on the other hand, at the time of head seek there occurs loss in the drive voltage, which becomes great problem specifically in the low voltage drive by the battery. In other words, at the seek time the control circuit 14 puts the transister 16 of economy switch in the on-operation state, but the transister 16 has saturation voltage between emitter and collector, and the portion of this saturation voltage causes in the voltage loss.

Therefore, in the prior art device, in order to obtain the high voltage enough to cover the voltage loss in the case of battery drive, some kinds of means are required, a DC/DC convertor or the like for example, which makes the device get larger on the contrary, and there occurs another problem that relatively major amount of the electric current is wasted in the convertor.

SUMMARY OF THE INVENTION

Accordingly it is an object of the present invention to provide an improved driving circuit of a stepping motor for a floppy disk drive which can achieve a requested power saving operation in spite of simple composition without using a power saving transistor or the like which causes in voltage loss at seek time.

In keeping with the principle of the present invention, the object is accomplished with the driving circuit of the stepping motor for the floppy disk drive wherein feeding control signals are supplied from a control circuit to a driver after it is once supplied to an all zero power circuit which passes the feeding control signals through to the driver as they are at the seek time in order to take a requested head feeding action and, on the other hand, outputs all zero signals to the driver in spite of the feeding control signals in supply at electricity saving time, which switches the driver itself to a complete electric current cutoff state, after logical operation of the feeding control signals and the electricity saving signal, so that the requested power saving operation can be achieved.

Therefore, according to the present invention, in the normal seek time the all zero power circuit supplies the feeding control signals to the driver as they are, and prevents from occurrence of the voltage loss.

DETAILED DESCRIPTION OF THE EMBODIMENT

Figure 1:
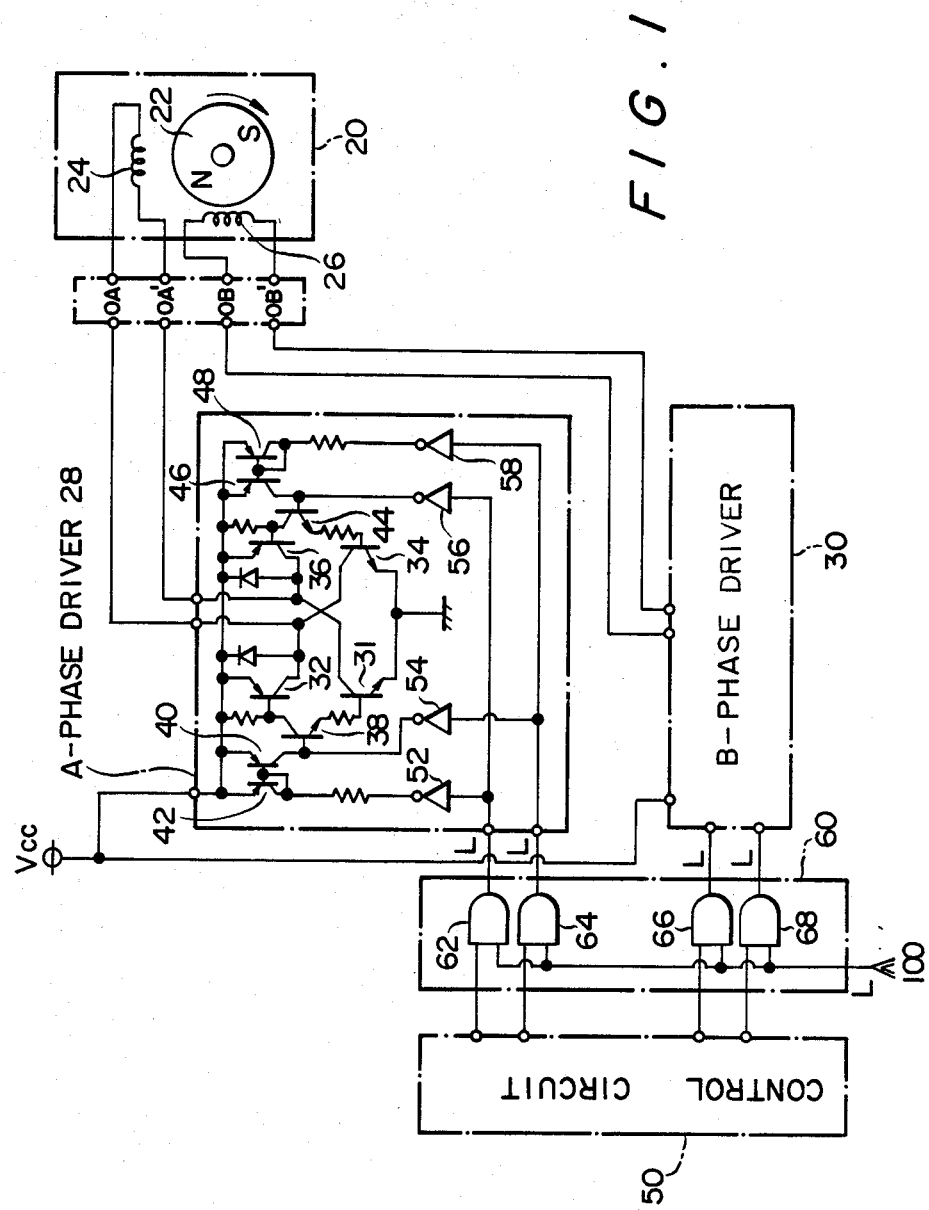
FIG. 1 is a circuit diagram showing a preferred embodiment of a driving circuit of a stepping motor in accordance with the teachings of the present invention.

In FIG. 1 shown therein is a preferred embodiment of a driving circuit of a stepping motor in accordance with the teachings of the present invention. The stepping motor 20 includes a magnet rotor 22 in the same way with the prior art device, and two phase stator coils 24 and 26 in the embodiment. Alternatively inverting control of electric current supplied to both of the coils 24 and 26 step ahead the rotor 22 by predetermined amount.

In order to supply feeding control signals to both of the coils 24 and 26 arranged therein are an A phase driver 28 and a B phase driver 30. As both of the drivers 28 and 30 consist of same compositions, the A phase driver 28 will be hereinafter described.

The driver 28 includes a pair of driving transistors 31 and 32 on the OA side and a pair of driving transistors 34 and 36 on the OA' side, and also comprises control transistors 38, 40, 42 and 44, 46, 48 to control to operate on and off these driving transistors 31 through 36.

A control circuit 50 outputs feeding control signals to control the driver 28, and the driver 28 includes inverters 52, 54, 56 and 58 to invert the feeding control signals. Both of the drivers 28 and 30 mentioned above receives predetermined voltage from a power source Vcc.

It is characterized in the present invention that the feeding control signals output from the control circuit 50 are not provided to both of the drivers 28 and 30 directly, but are provided through an all zero power circuit 60 which includes AND gates 62, 64, 66 and 68 being respectively arranged to correspond to each of the feeding control signals. The respective AND gates 62 through 68 are applied an electricity saving signal 100 to perform logical operation with the feeding control signals supplied from the control circuit 50.

Four different binary words of four digits (with digits "L" and "H" respectively) are output from control circuit 50 to allow the phases of stepping motor 20 to be driven sequentially according to step commands.

Figure 2:
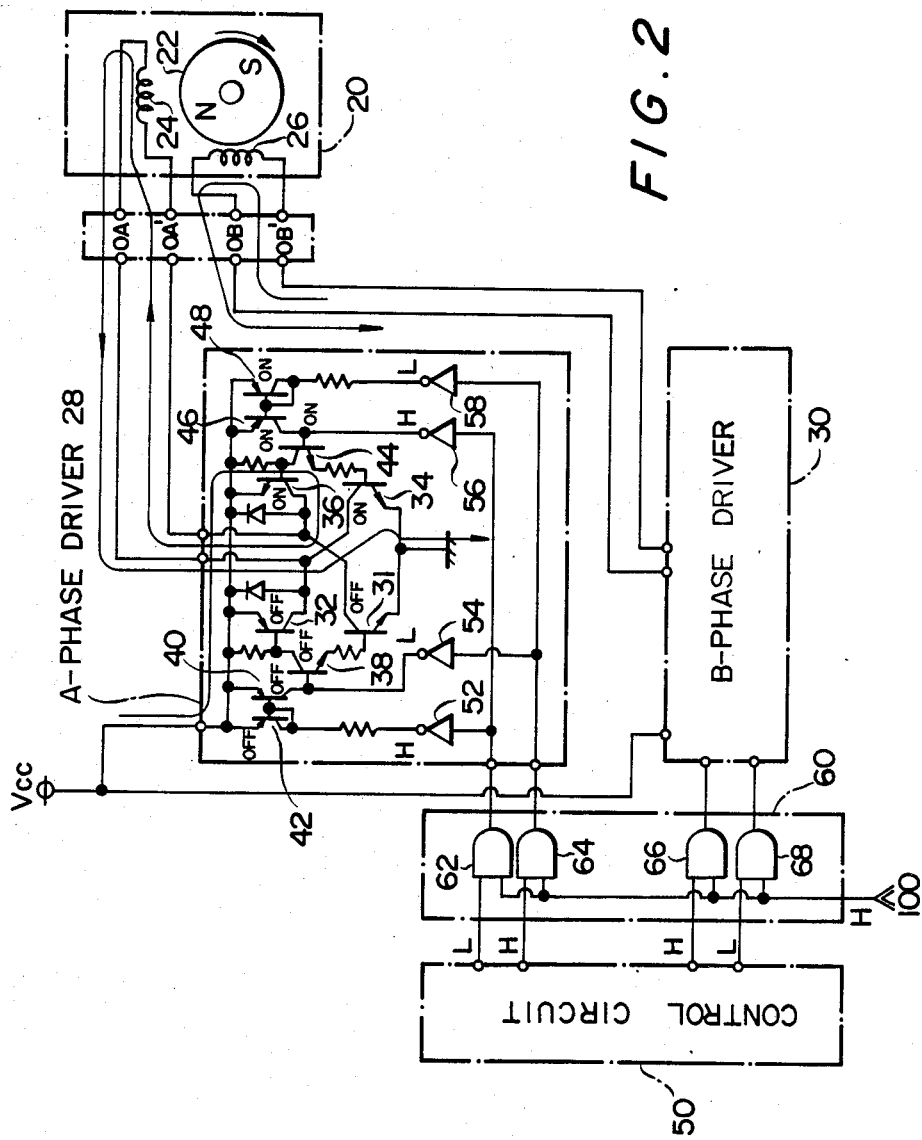
FIG. 2 is an illustration describing one example of a driving state at the seek time.
Figure 3:
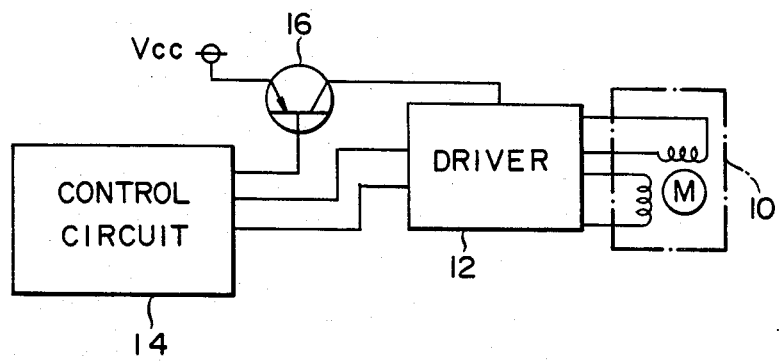
FIG. 3 is a schematic circuit diagram showing an example of electricity saving circuit in the prior art device.

In FIG. 2 shown therein is such a state that the feeding control signals are output in the state as shown in FIG. 2 from the control circuit 50 and the electricity saving signal 100 is "H" in order to seek the head.

In this state, since the all zero power circuit 60 opens all of the AND gates 62 through 68 by the electricity saving signal 100, the feeding control signals are applied to the drivers 28 and 30 without changes.

In the A phase driver 28 the feeding control signals are inverted by the inverters 52 through 58 as shown in Figure, and each of the transistors is put in the on or off state as shown in Figure. Consequently, electric current from the power source Vcc is supplied from the transistor 36 to the coil 24 of the stepping motor 20 as shown by the arrows, and return to the A phase driver 28 again to flow through the transistor 34.

In the same manner, the electric current flows from the B phase driver 30 to the coil 26 as shown by arrow, and the rotor 22 is driven to rotate to a predetermined position depending on the electric direction at this time.

As mentioned above, since at the seek time the all zero power circuit 60 opens the gate circuits 62 through 68 only, the voltage loss in the all zero power circuit 60 can be ignored, and the head seek action can be preferably taken without any loss.

On the other hand, when the electricity saving signal 100 is directly supplied from the control circuit 50 or a host computor, the electricity saving signal 100 becomes "L", as is shown in FIG. 1, and all of the AND gate 62 through 68 in the all zero power circuit 60 is put in the off-state as a result. The input to both of the drivers 28 and 30 becomes "L" in spite of the feeding control signals in supply at this time. Consequently, all of the transistors are switched into the off-state in both of the drivers 28 and 30, and the electric current is not supplied to the coils 24 and 26, neither. Accordingly, the electric current flowing to the drivers 28 and 30 and the stepping motor 20 is completely cut off and the preferable power saving action can be accomplished at the standby and at the seek time.

As described heretofore, according to the present invention, since the feeding control signals output from the control circuit are supplied to each of the drivers through the all zero power circuit which performs logical operation of the feeding control signals and the electricity saving signal, there is no requirement of the electricity saving transistor which cuts off the power voltage supply at the electricity saving time. Therefore, the power voltage loss for the saturation voltage between emitter and collector of the electricity saving transistor being arranged in the prior art device can be firmly deleted at the head seek time so that the device can be driven in low voltage, and the system can be designed in small sizes and in battery driving operation.

What is claimed is:

1. In a driving circuit of a stepping motor for a floppy disk drive which drives the stepping motor by feeding control signals supplied from a control circuit through drivers in order to feed a carriage, an improvement of which comprises:

an all zero power circuit which logically operates on the feeding control signals and an electricity saving signal and which outputs signals to all of the drivers such that when the electricity saving signal is applied to the all zero power circuit, electric current is completely cut off to be stopped flowing to the drivers and the stepping motor in spite of the application of the feeding control signals to the all zero power circuit.

2. A driving circuit of a stepping motor for a floppy disk drive according to claim 1, wherein said all zero power circuit consists of AND gates which logically operate on the feeding control signals supplied from the control circuit and the electricity saving signal.

3. A driving circuit of a stepping motor for a floppy disk drive according to claim 2, wherein said AND gates are arranged to correspond to every output from the control circuit.

4. A driving circuit of a stepping motor for a floppy disk drive according to claim 3, wherein the drivers consist of an A phase driver and a B phase driver which respectively correspond to each of two phase stator coils of the stepping motor; the control circuit is composed so that said two drivers can respectively receive two different binary digit words as control signals; the all zero power circuit consists of four AND gates which respectively input binary words of four digits as control signals from the control circuit; and the electricity saving signal is input to each of the AND gates.

* * * * *